Feb. 12, 1952 E. ALTMAN 2,585,073
PEACH PITTING MACHINE
Filed Feb. 9, 1949 5 Sheets-Sheet 1

Elston Altman
INVENTOR
BY C. A. Snow & Co.
ATTORNEYS.

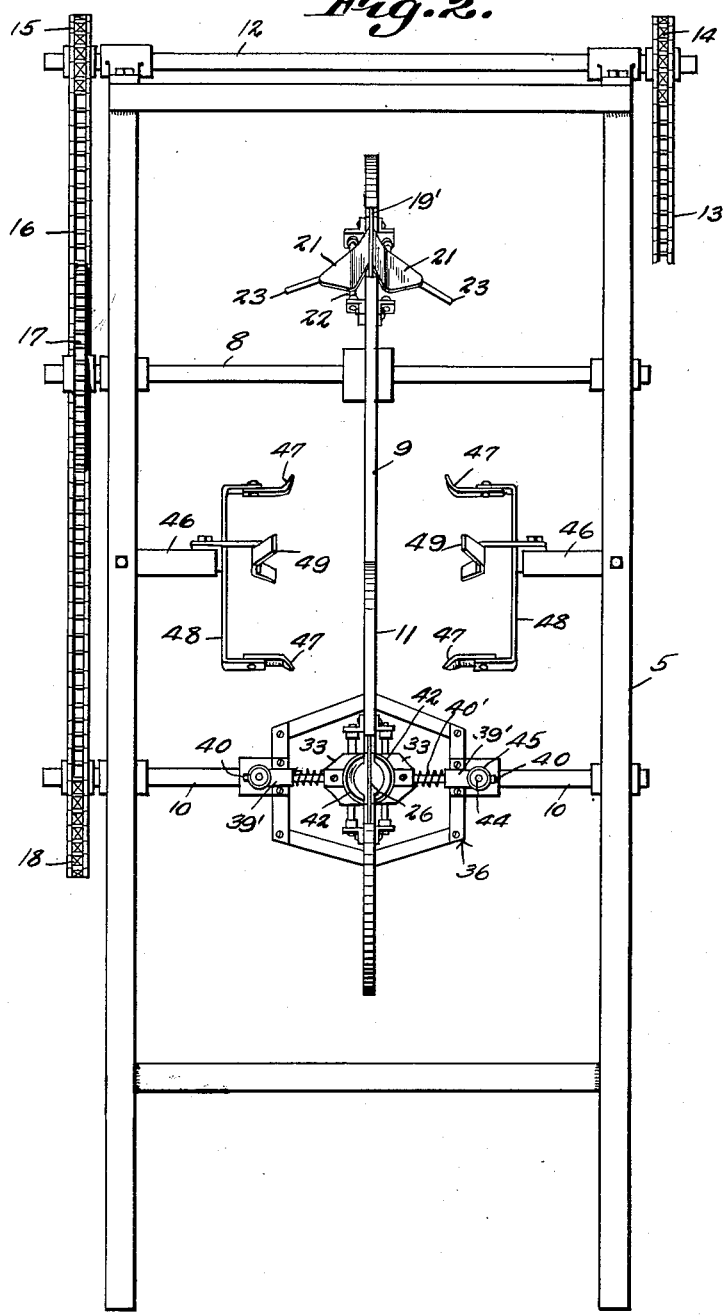

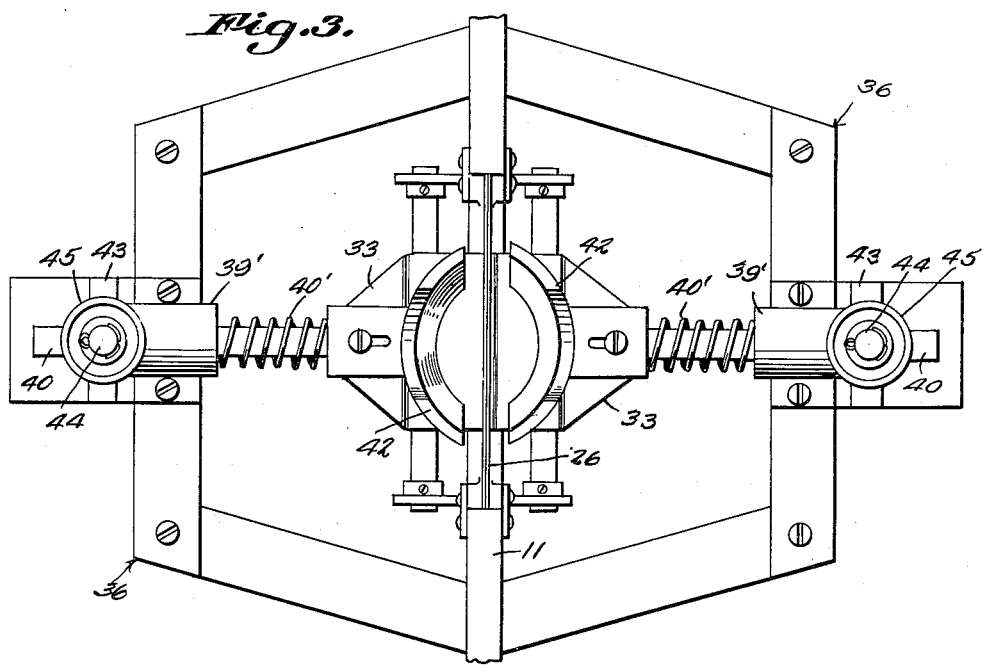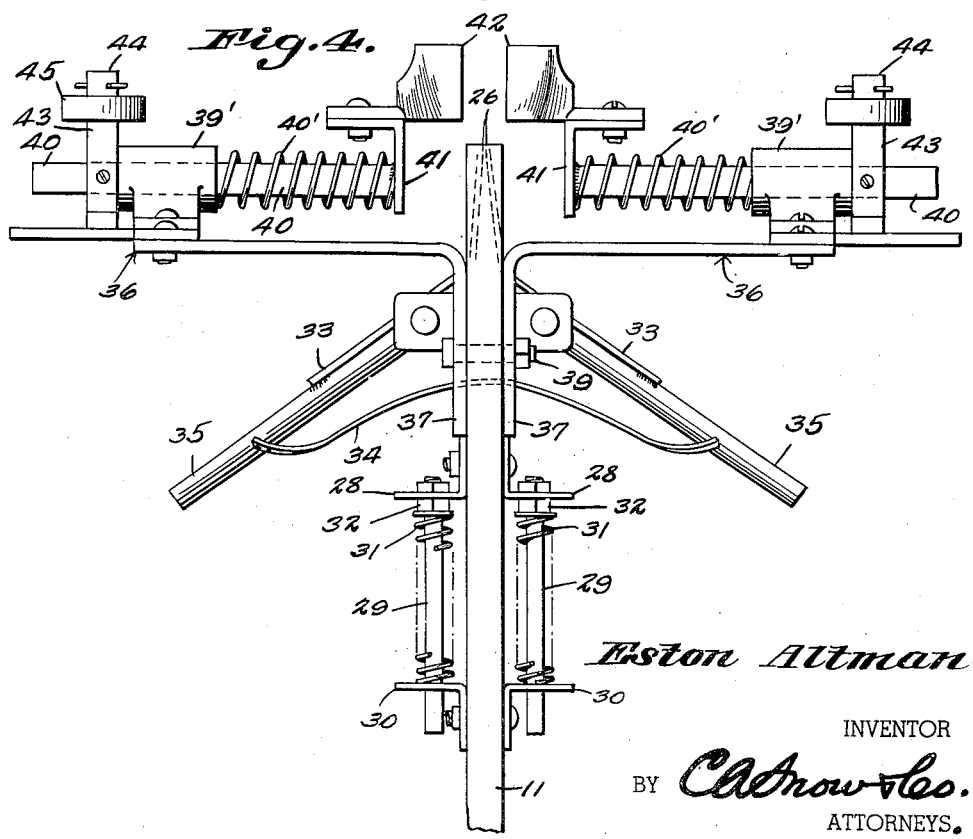

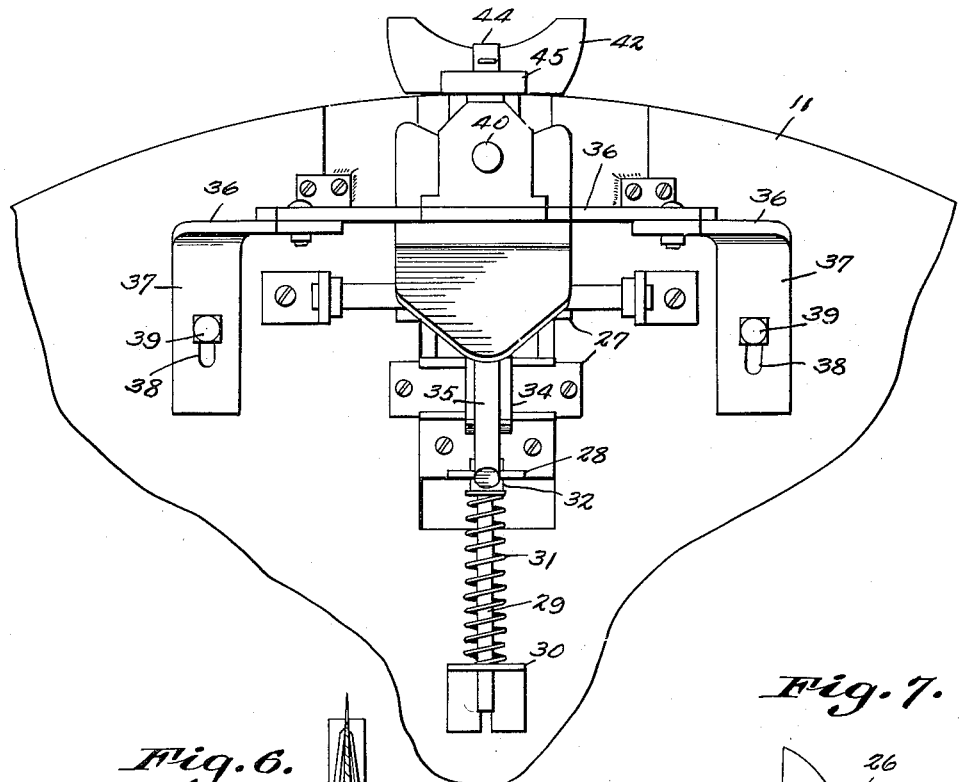
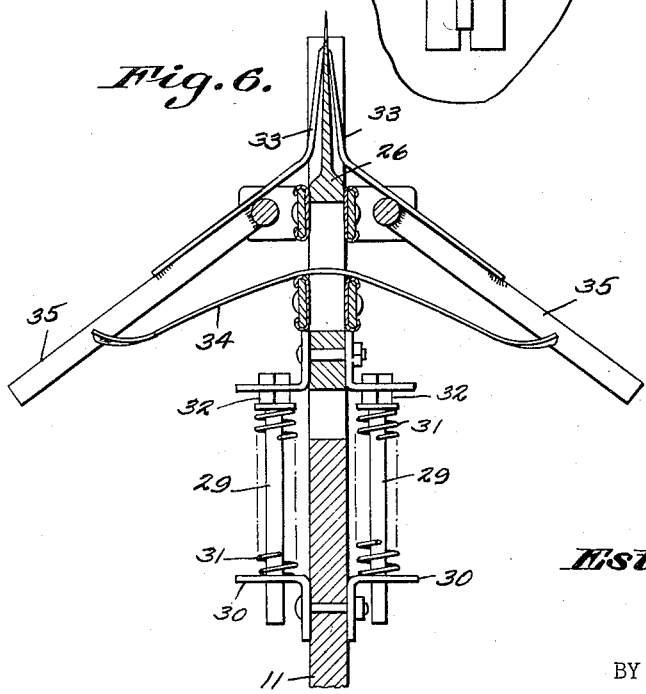
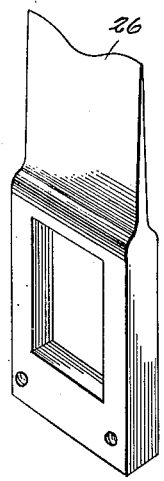
Elton Altman
INVENTOR

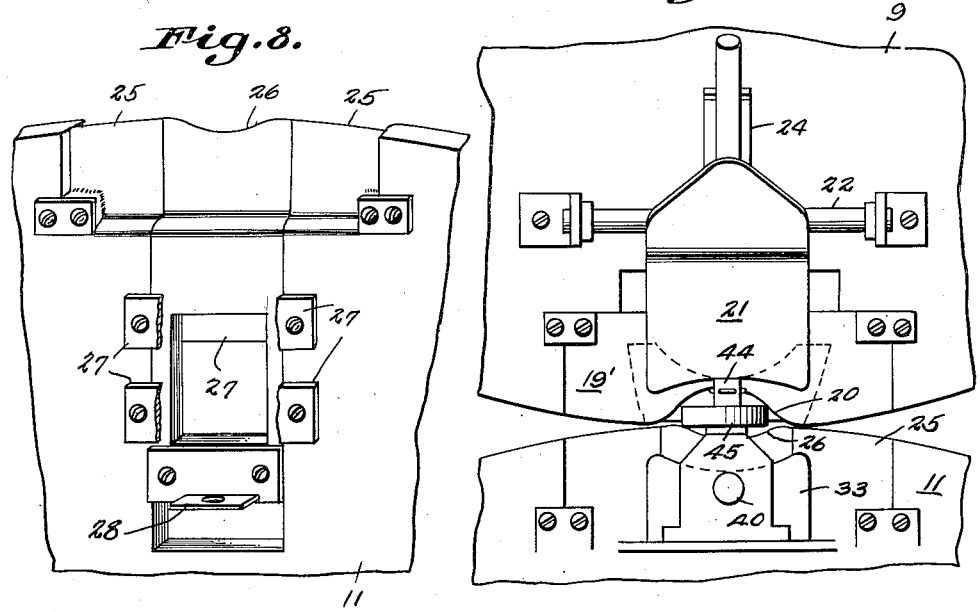
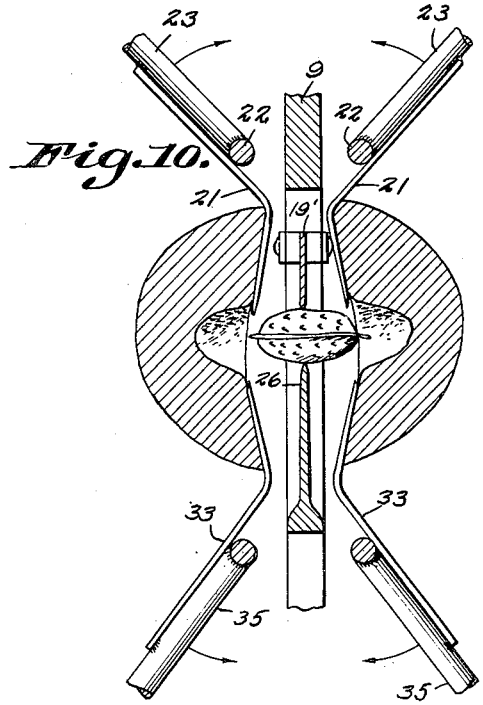

Patented Feb. 12, 1952

2,585,073

UNITED STATES PATENT OFFICE 2,585,073

PEACH PITTING MACHINE

Eston Altman, Valdosta, Ga.

Application February 9, 1949, Serial No. 75,391

6 Claims. (Cl. 146—28)

This invention relates to a machine designed for splitting and pitting peaches, the primary object of the invention being to provide a machine which may be fed by hands or by means of an endless conveyor, the peaches to be pitted being dropped into split cups which hold the peaches being pitted for the action of the knife which splits the peach, allowing the seed to fall therefrom.

Another object of the invention is to provide a peach pitting machine wherein the knives thereof move through the meat of the peach contacting with the seed, the operation of the knives being self-adjusting so that they adjust themselves to seed size so that the knives hold and clamp the seed until the meat of the seed falls away from the seed.

Still another object of the invention is to provide pivoted members which contact with the meat of the peach for moving the sections of the peach away from the seed after the peach has been properly cut.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Fig. 2 is a front elevational view thereof.

Fig. 3 is an enlarged plan view of one of the cups in which the peaches are held during the cutting of the peaches.

Fig. 4 is a front elevational view thereof.

Fig. 5 is a bottom view of one of the peach pitting heads.

Fig. 6 is a vertical sectional view through the lower disc and one of the heads of the pitting machine.

Fig. 7 is a perspective view of one of the blades of the machine.

Fig. 8 is a view illustrating the manner of supporting the movable blade of the machine.

Fig. 9 is a fragmental elevational view illustrating the relative position between the upper disc and lower disc of the machine when the pitting heads move together.

Fig. 10 is a detail view illustrating the operation of the spreaders in moving the sections of the peach away from the seed after the peach has been cut.

Figure 1:
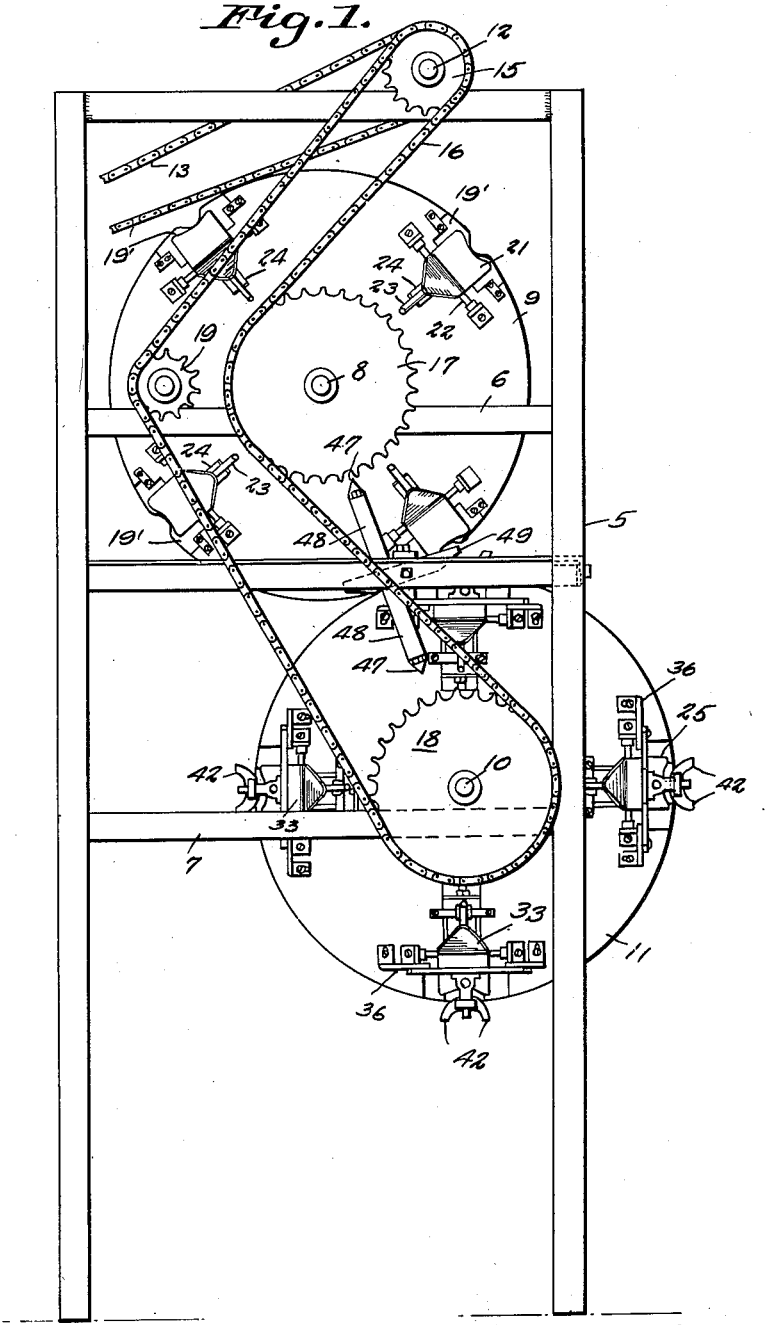
Figure 1 is a side elevational view of a peach pitting machine constructed in accordance with the invention.

Referring to the drawings in detail, the machine comprises an upright frame indicated generally by the reference character 5 which frame includes spaced horizontal side bars 6 and 7 respectively, the bars 6 being disposed above the bars 7, as clearly shown by Fig. 1 of the drawings.

The bars 6 are provided with bearings in which the shaft 8 operates, the shaft 8 providing a support for the disc 9 which is secured to the shaft 8 to rotate therewith.

The side bars 7 provide a support for bearings in which the lower shaft 10 operates, the lower shaft 10 supporting the lower disc 11, the discs 9 and 11 being so constructed and arranged that their peripheral edges contact, as clearly shown by Fig. 1 of the drawings.

Mounted in bearings at the top of the upright frame 5, is the shaft 12 which is rotated by means of the chain 13 operating over the sprocket 14 secured to the shaft 12, the chain 13 operating over a suitable sprocket operated by a power device not shown.

At one end of the shaft 12 is the sprocket 15 over which the chain 16 operates, the chain 16 also operating over the sprocket 17 mounted on the shaft 8, and the sprocket 18 secured to the shaft 10. The chain 16 also operates over the idle sprocket 19 mounted at the rear of the frame. Due to this construction, it will be seen that the discs 9 and 11 are rotated in opposite directions when the machine is in operation.

The upper disc 9 is provided with cut out portions extending inwardly from the edge thereof, the cut out portions being arranged equidistantly apart where they support the stationary blades 19', the blades being provided with curved portions 20 curved to conform to the curvature of a peach seed, to firmly grip the peach seed after the blade has passed through the meat of the peach.

Pivotally mounted at opposite sides of the disc 9, and arranged adjacent to each blade 19, are the blades 21 secured to the shafts 22 to move therewith. Each of these blades 21 is provided with an arm 23 extending inwardly therefrom, the arms being disposed at oblique angles with respect to the blades 21, as shown by Fig. 10 of the drawings.

Leaf springs 24 are curved and extend transversely through openings in the disc 9, the leaf springs being slightly curved and formed with notches in their ends to fit around the arms 23 securing the leaf springs to the arms in such a way that the normal action of the leaf springs is to move the blades 21 into close engagement with the stationary blade 19, associated therewith.

The lower disc 11 is also provided with cut out portions extending inwardly from the edge thereof, the cut out portions accommodating the stationary blades 25 which have cut away portions disposed intermediate their side edges, in which the movable blades 26 operate, the movable blades 26 moving under the straps 27 that are arranged on opposite sides of the cut out portions of the lower disc 11, providing guides for the movable blades 26. It will of course be understood that these cut out portions are so arranged in the disc 11, and with respect to the stationary blades of the disc 9, that the cutting blades of the disc 11 will move into cutting relation with the stationary blades of the disc 9, as the discs rotate.

Extending laterally from the inner ends of the blades 26, are lugs 28 which are formed with openings in which the bolts 29 are secured, the inner ends of the bolts operating through the openings formed in the ears 30 secured to opposite sides of the disc 11, directly opposite to the lugs 28. Coiled springs 31 are positioned on the bolts 29 and rest on the ears 30, the outer ends of the springs resting against the nuts 32 that are used in securing the bolts 29 to the lugs 28. Due to this construction, it will be seen that the blades 26 will be normally urged outwardly to contact with peaches under treatment, the blades moving inwardly towards the center of the disc 11, as the blades contact with the seed being removed.

Arranged on opposite sides of the disc 11, adjacent to the blades 26, are pivoted blades 33, which pivoted blades as well as the movable blade 26, are provided with curved cutting edges to conform to the curvature of a peach stone against which the blades contact during the operation of the machine. As shown by Fig. 6 of the drawings, the blades 33 are appreciably shorter than the blades 26, so that as the blades 26 move inwardly as they engage the peach seed, the pivoted blades 33 will not contact with the seed until the meat of the peach has been cut through.

Leaf springs 34 extend transversely through openings formed in the disc and blades 26, the ends of the leaf springs 34 being notched to fit over the arms 35 that extend from the pivoted blades 33.

Extending laterally at each side of the disc 11, adjacent to the movable blades 26, are frames 36, which frames include end members 37 that are formed with elongated openings 38 through which the bolts 39 extend, the bolts 39 being secured to the disc 11 by passing the bolts through openings in the discs. This construction permits of movement of the frames to adjust them for the accurate operation of the machine.

These frames 36 are formed with bearings 39' shown more clearly by Figs. 3 and 4 of the drawings, through which the rods 40 operate, the rods 40 carrying the brackets 41 at their forward ends, which brackets support the cup sections 42, which cup sections are shaped to receive a peach therebetween in such a way that the peach will be held for the action of the blade operating therethrough.

Coiled springs 40' are disposed on the rods 40 and engage the brackets 41 and inner edges of the bearings 39', the springs acting to normally urge the cup sections towards each other.

Secured to each of the rods 40, is a member 43 that has a shaft 44 extending vertically therefrom, the shafts 44 supporting the rollers 45 that operate at right angles with respect to the rods 40.

Forming a part of the upright frame, are horizontal bars 46 that provide supports for the blade actuating fingers 47 mounted on the bars 48, the bars 48 being disposed vertically so that the fingers 47 extend inwardly with their free ends curved slightly outwardly. These bars 48 and fingers 47 are arranged on opposite sides of the discs at points adjacent to the contacting points of the discs 9 and 11. These fingers 47 are so arranged that as the discs rotate, the arms 35 will engage the fingers 47 swinging the arms 35 inwardly against the action of the spring 34, the blades 33 of the arms swinging outwardly releasing the peach halves which have been formed by the cutting of the peach by the movable blades 26.

Supported by the horizontal bars 46 are cam members 49 which are constructed in such a way that they will move against the rollers 45 moving the rods 40, on which the rollers are mounted, laterally against the action of the coiled springs 40', separating the cup sections 42 to release the peach contained therein.

The operation of the machine is as follows: As the discs are rotated, and the cup sections 42 move to an upper position, a peach is placed in the split cups, with the cups facing straight upwardly. As the top and bottom discs roll together, the peach moves towards the center line of the disc axis in place over the knife 26 operating between the cup sections 42 of the bottom disc. When the discs roll together the blades 19 and 26 enter the meat of the peach cutting the meat of the peach until the center knife 26 adjusts itself by contact with the seed, holding and clamping the seed against movement. After this operation, the meat of the peach is cut and the seed is now being held between the edges of the blade. The pivoted blades 33 are moved away from each other by contact of the arms 35 with the fingers 47, the halves of the peach being moved away from the seed which is now gripped between the upper and lower blades of the machine.

After the cups pass the center line, the split cups move back supporting the split peach which is carried over to the rear of the machine and discharged by falling therefrom.

It will of course be understood that prior to the outward movement of the blades 33, the cam members 49 engage the rollers 45 moving the cup sections laterally away from the peach sections, so that the blades 33 may separate the peach sections which have been cut.

Having thus described the invention, what is claimed is:

1. A peach pitting and slicing machine, comprising an upright frame, upper and lower discs operating in vertical parallel planes, mounted on the frame, the peripheries of said discs contacting, blades mounted on the upper and lower discs at the peripheries thereof, with their cutting edges disposed outwardly, laterally movable peach supporting cups mounted on the lower disc in spaced relation with respect to each other, said cups extending beyond the periphery of the disc, said cups embodying sections, mounted for sliding movement towards and away from each other, adjacent to the blades of the lower disc and between which sections the blades of the discs move in cutting peaches held in the cups, and pivoted laterally swinging blades mounting on opposite sides of the discs adjacent to the cups engaging the cut peaches, separating the cut sections of the peach from the pit held between the blades of the discs, and means for operating said laterally swinging blades.

2. A peach pitting and slicing machine, comprising an upright frame, upper and lower discs operating in vertical parallel planes, mounted on the frame, the peripheries of the discs contacting during the rotation, blades mounted on the upper and lower discs at the peripheries thereof, with the cutting edges of the blades disposed outwardly, peach holding cups mounted on the lower disc adjacent to the periphery thereof, said cups embodying separable cup sections between which the blades move in cutting peaches held in the cups as the discs rotate, said blades engaging and holding the pits of the peaches therebetween, sliding rods on which the cup sections are secured, means for operating the rods as the discs rotate separating the cup sections releasing the cut sections of the peach, and means mounted on the discs for moving the sliced peach sections laterally away from the cup sections.

3. A peach pitting and slicing machine, comprising an upright frame, upper and lower discs operating in vertical parallel planes, mounted on the frame, the peripheries of said discs contacting, blades mounted on the upper and lower discs at the peripheries thereof with their cutting edges disposed outwardly, laterally movable peach cup sections mounted on opposite sides of the lower disc between which a peach to be pitted is held, said blades moving between the cup sections cutting the peach held therein and gripping the peach pit as said discs rotate, and means mounted on the lower disc for separating the cup sections releasing the peach sections.

4. A peach pitting and slicing machine comprising an upright frame, upper and lower rotary discs mounted on the frame and operating in vertical parallel planes with their peripheries in contact, stationary blades supported by the upper disc, the cutting edges of the blades being disposed outwardly adjacent to the periphery of the disc, blades slidably mounted on the lower disc with their cutting edges disposed adjacent to the periphery thereof and extending outwardly, peach retaining cup sections slidably mounted on the lower disc, at the periphery thereof adjacent to said slidable blades, said cup sections operating at right angles to the peripheries of the discs, means yieldably carried by the lower disc for engaging said cup sections moving the cup sections together in gripping a peach, said blades cutting the peach held between the cup as the blades of the disc move together, the blades gripping and holding the pit of the peach, means mounted on the lower disc for moving the cup sections laterally separating the cut peach sections from the peach seed, and said slidable blades being movable away from the stationary blades releasing the peach pit as the blades rotate.

5. A peach pitting and slicing machine, comprising an upright frame, upper and lower discs operating in vertical parallel planes, mounted on the frame, the peripheries of said discs contacting, sectional cups mounted on the lower disc within which peaches are held, cooperating blades mounted on the upper and lower discs with their cutting edges disposed outwardly, mounted at the peripheries of the discs, said blades adapted to cut peaches held within the cups as the blades of the discs move together, said blades moving into contact with the pit of the peach holding the pit, and pivoted members operating adjacent to said blades and engaging the cut sections of the peach, separating said cut sections of the peach from the pit of the peach held between said blades, when the cut sections are separated.

6. A peach pitting and slicing machine comprising an upright frame, upper and lower discs operating in vertical parallel planes mounted on the frame, the peripheries of said discs contacting during rotation of the discs, cutting blades mounted on the upper disc at the periphery thereof, the blades being spaced apart and having their cutting edges disposed outwardly, cutting blades mounted for radial sliding movement on the lower disc, peach supporting cups embodying laterally separable sections supported on the lower disc adjacent to the periphery thereof, springs mounted on the lower discs normally urging the sections into clamping relation with peaches positioned in the cups, the cutting blades of the upper and lower discs moving through peaches held in the peach cups halving the peaches as the discs rotate in unison, laterally pivoted blades mounted on the sides of the lower disc, disposed adjacent to the cutting blades of the discs and engaging the halved peaches, moving the peach halves laterally, releasing the peach halves.

ESTON ALTMAN.

REFERENCES CITED

The following references are of record in the file of this patent:

UNITED STATES PATENTS

| Number | Name | Date |
|---|---|---|
| 174,371 | Lillie | Mar. 7, 1876 |
| 786,482 | Caldwell | Apr. 4, 1905 |
| 1,075,547 | Caldwell | Oct. 14, 1913 |
| 1,334,449 | Griffin | Mar. 23, 1920 |
| 1,526,635 | Groves | Feb. 17, 1925 |
| 1,754,636 | McCollom | Apr. 15, 1930 |